Oct. 19, 1954
J. E. SZITAR, JR
2,692,112
FUEL DRAIN VALVE WITH DETENT AND DETENT RELEASE
Filed March 21, 1951
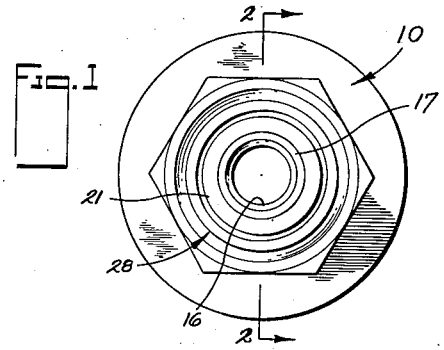
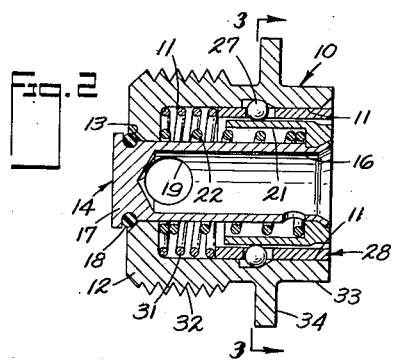
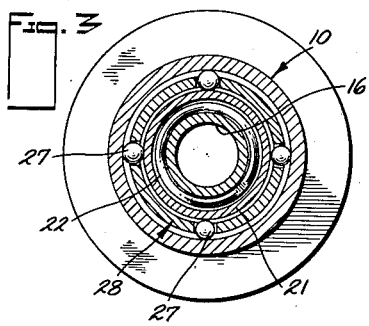
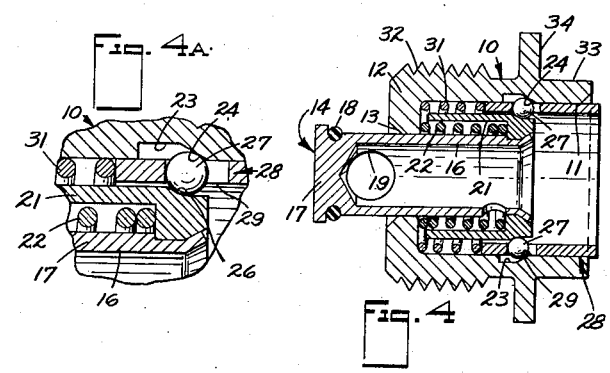
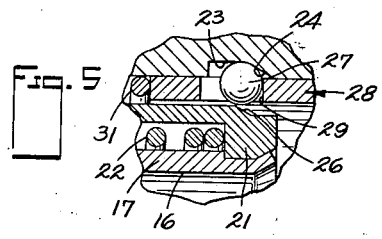
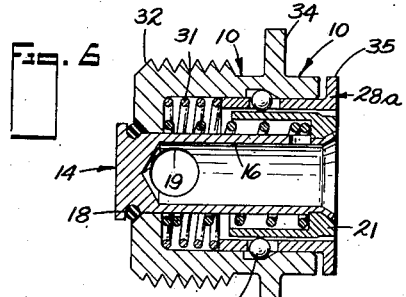
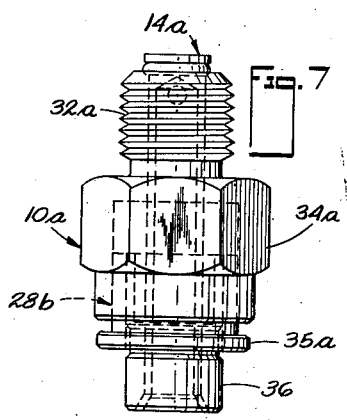
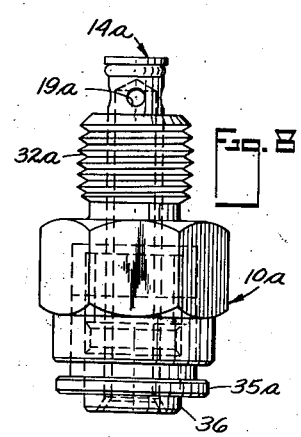
INVENTOR.
JOHN E. SZITAR, JR.
BY
*Richey & Watts*
ATTORNEYS

Patented Oct. 19, 1954

2,692,112

UNITED STATES PATENT OFFICE

2,692,112

FUEL DRAIN VALVE WITH DETENT AND DETENT RELEASE

John E. Szitar, Jr., Cleveland, Ohio, assignor to The Weatherhead Company, Cleveland, Ohio, a corporation of Ohio Application March 21, 1951, Serial No. 216,773

3 Claims. (Cl. 251—66)

This invention relates to valves and more particularly to valves particularly suitable for use as drain cocks on fuel tanks or the like.

In many drain cock installations such as in air-land vehicles, it is desired that drain cocks be installed which offer minimum restriction of flow and which can be readily opened and closed with one hand without the use of special tools and without need for the valve to be clearly visible or readily accessible. It is also desirable that such drain cocks have no projecting parts such as screw-threaded nipples which are subject to breakage and in case of aircraft installations cause objectionable aerodynamic drag, particularly at the high speeds now attainable by aircraft.

The drain cock of this invention meets the aforesaid requirements. It provides for rapid discharge. Any projecting parts are sturdy and not readily damaged and the valve can be opened by hand or, in some forms, by the use of any simple tool such as a screw-driver or a rod and can be closed by a simple pressure of the thumb or the fingers of the user. Briefly, this is accomplished in the preferred form of the invention by providing a valve body carrying a sliding valve member which has a passageway therethrough that is opened and closed by sliding the valve member in the body. There are detent means which automatically hold the valve open when it is pushed open manually, and which can be released without tools by simply applying thumb or finger pressure on a part of the detent mechanism.

The manner in which these advantages may be obtained will be apparent in the following detailed description with my preferred embodiment of the invention.

In the drawings:

Fig. 1 is an end view of the device;

Fig. 2 is a section taken on 2—2 of Fig. 1;

Fig. 3 is a section taken on 3—3 of Fig. 2;

Fig. 4 is a section like Fig. 2 with the valve open;

Fig. 4a is a fragmentary enlargement view showing the detent means in position to hold the valve open;

Fig. 5 is a fragmentary enlargement view showing how the detent means may be released;

Fig. 6 shows a modified form of the invention; and,

Figs. 7 and 8 show still another form with the valve respectively in its closed and open positions.

The valve body, indicated generally at 10, has an axial bore 11 and a flange 12 is formed at the axially inner end thereof to provide a valve seat 13. Valve member 14 is slidable in the valve body and is in the form of an axial sleeve having a fluid passageway 16 and an inner or end wall 17. An O-ring seal 18 is mounted on member 14 for co-operation with the valve seat 13. A plurality of radial ports 19 penetrate the side wall of the valve member and provide for draining the tank or vessel to which the valve is attached. Mounted on the valve member 14 is a sleeve 21 permanently attached thereto by a spinning or brazing operation. Main valve spring 22 extends between the body flange 12 and the base of the sleeve 21 tending to move the valve member 14 axially outwardly to close the valve.

The detent mechanism is in the form of a groove 23 in the valve body opening into the bore 11 therein and having a shoulder portion 24 preferably tapered facing towards the valve seat, which is towards the axially inner end of the valve. The valve member sleeve 21 has a complementary shoulder 26 preferably of rounded profile and disposed in opposition to body shoulder 24. Four detent members 27 preferably in the form of hardened steel balls are formed for co-operation with the two shoulders to hold the valve open.

In order to insure that the valve will remain open and to provide for the closing of the valve, a sleeve 28 is slidably mounted in the bore 11 of the valve body and is formed with apertures 29 that loosely receive the balls 27. A detent spring 31 extends between the flange 12 on the inner end of the body and the opposed end of the sleeve 28.

In a fluid tank or similar installation, the body is threaded as at 32 and has a wrench-receiving portion 33 as well as a gasket-mating flange shown at 34. With the valve in its closed position (seen in Fig. 2) the dimensions of the parts are such that the sleeve 21 rides freely past the balls 27, which are now disposed in the deepest portion of the recess 23 in the valve body. In the form of the invention being described, sleeve 28 is proportioned, as is valve member 14, so that when the valve is closed neither project axially outwardly past the protecting body wrench-receiving portion 10.

When it is desired to drain the tank or vessel to which the valve is fitted, the operator need merely apply a screw driver or similar tool into the drain passage 16 in the valve member and push the valve open until the shoulder 26 moves axially inwardly past the shoulder 24 at the body recess. At this point, spring 31 of the detent sleeve forces the balls 27 between the opposed body and valve member shoulders 24 and 26 respectively, and the relative strengths of the main valve spring 22 and the detent spring 31 are so arranged that the valve will remain in its open position. In the construction shown, the valve stays open because any resultant force of the main valve spring 22, as reflected in the camming action of the valve member shoulder 26 against the balls 27 tending to move the balls axially and radially into the deeper portion of recess 23, is overcome by the force of detent spring 31 which holds the balls against axial motion so that the balls and shoulder keep the valve open.

It will be noted in Fig. 4 that the end of sleeve 28 now projects slightly past the body portion at the lower or outer end of the valve. When it is desired to close the valve, sleeve 28 is merely pressed axially inwardly overcoming the tension of the detent spring 31 and forcing the balls axially inwardly whereupon the wedge action of the shoulder 26 moves the balls 27 radially outwardly into the deeper zone of recess 23 in the body. When the balls are forced by operating sleeve 28 to the point illustrated in Fig. 5, the valve member is freed and snaps closed under action of the main valve spring. Thus, it can be seen that I have provided a valve which can be opened by the simplest and most available of tools and which can be closed without any tools.

The form of the invention shown in Fig. 6 has a mode of operation like that of the form just described except that the detent sleeve 28a is flanged as at 35 to provide a greater area for manipulation by manual thumb or finger pressure.

In the form shown in Figs. 7 and 8, the body 10a is somewhat more elongated, the detent sleeve 28b is flanged as at 35a (like the form of Fig. 6) and furthermore, valve member 14a is extended as at 36. The latter construction eliminates need for use of a rod or screw driver for opening the valve.

The valve can be operated out of sight of the operator, who need only by sense of touch push on the valve member to open it and on the releasing sleeve to close it. It will be noted that the valve can be readily operated at arms' length by one hand and can be very quickly opened and closed.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A valve comprising a body having a bore therethrough, a valve seat on said body, a valve member slidable in said bore and having closure means for engaging said seat, a valve spring tending to move said valve member axially outwardly in said bore to close said valve, a recess in said body opening into said bore and having an inclined shoulder portion on the axial outer side of said recess, said valve member having a cylindrical portion and a shoulder portion facing generally the opposite direction from the direction said body shoulder portion faces, a detent in said recess for engaging said shoulder portions to retain the valve open, axially slidable means for moving said detent to clear one of said shoulder portions to permit said spring to close the valve, and a second spring urging said detent against said body shoulder portion, the incline of said inclined shoulder portion of said body being such that when the detent is in said recess of the body and engaging said cylindrical portion said valve spring urges the valve member into engagement with said valve seat.

2. A valve comprising a body having a bore therethrough, a valve seat on said body, a valve member slidable in said bore and having closure means for engaging said seat, a spring tending to move said valve member axially outwardly in said bore to close said valve, an inclined recess in said body opening into said bore and having a shoulder portion on the axial outer side of said recess, said valve member having a cylindrical portion and a shoulder portion facing generally the opposite direction from the direction said other shoulder portion faces, a ball detent in said recess for engaging said shoulder portions to retain the valve open, an axially slidable sleeve between said valve member and body and apertured to receive said ball, said sleeve projecting past the axially outer end of said valve with the valve open to facilitate moving said detent to clear one of said shoulder portions and thus permit said spring to close the valve, and a second spring extending between said body and sleeve for urging said ball against said body shoulder portion, the incline of said inclined shoulder portion of said body being such that when the detent is in said recess of the body and engaging said cylindrical portion said valve spring urges the valve member into engagement with said valve seat.

3. A valve comprising a body having a bore therethrough, a valve seat on said body, a valve member slidable in said bore and having closure means for engaging said seat, a valve spring tending to move said valve member axially outwardly in said bore to close said valve, a recess in said body opening into said bore and having an inclined shoulder portion on the axial outer side of said recess, said valve member having a shoulder portion facing generally the opposite direction from the direction said body shoulder portion faces, a detent in said recess for engaging said shoulder portions to retain the valve open, the axial force of said valve spring causing said shoulder portion on said valve member to cam said detent radially outward, axially slidable means for moving said detent to clear one of said shoulder portions to permit said spring to close the valve, and a second spring urging said detent against said body shoulder portion, said second spring being strong enough to hold said detent between said shoulders against the action of said valve spring.

References Cited in the file of this patent

UNITED STATES PATENTS

| Number | Name | Date |
|---|---|---|
| 1,301,577 | La Valley | Apr. 22, 1919 |
| 1,624,130 | Beggs | Apr. 12, 1927 |
| 2,429,202 | Estill | Oct. 21, 1947 |
| 2,463,253 | Earle | Mar. 1, 1949 |
| 2,506,722 | Kuehn | May 9, 1950 |

FOREIGN PATENTS

| Number | Country | Date |
|---|---|---|
| 439,602 | Great Britain | 1935 |